United States Patent
Abhyankar et al.

(10) Patent No.: US 9,298,228 B1
(45) Date of Patent: Mar. 29, 2016

(54) MEMORY CAPACITY EXPANSION USING A MEMORY RISER

(71) Applicant: Rambus Inc., Sunnyvale, CA (US)

(72) Inventors: Abhijit M. Abhyankar, Sunnyvale, CA (US); Ravindranath Kollipara, Palo Alto, CA (US); Thomas J. Giovannini, San Jose, CA (US); Ming Li, Fremont, CA (US); David A. Secker, San Jose, CA (US); Arun Vaidyanath, San Jose, CA (US); Donald R. Mullen, Berkeley, CA (US); Adrian F. Torres, Davis, CA (US)

(73) Assignee: Rambus Inc., Sunnyvale, CA (US)

( * ) Notice: Subject to any disclaimer, the term of this patent is extended or adjusted under 35 U.S.C. 154(b) by 0 days.

(21) Appl. No.: 14/810,410

(22) Filed: Jul. 27, 2015

Related U.S. Application Data

(60) Provisional application No. 62/115,588, filed on Feb. 12, 2015.

(51) Int. Cl.
*H05K 1/11* (2006.01)
*H05K 1/14* (2006.01)
*G06F 1/18* (2006.01)

(52) U.S. Cl.
CPC ..................... *G06F 1/185* (2013.01)

(58) Field of Classification Search
USPC ......... 361/736–737, 790, 788, 803, 796–802; 439/49, 65; 710/300–305
See application file for complete search history.

(56) References Cited

U.S. PATENT DOCUMENTS

| | | | |
|---|---|---|---|
| 5,790,447 A | 8/1998 | Laudon et al. | |
| 6,517,375 B2* | 2/2003 | MacLaren | H01R 13/64 439/489 |
| 6,611,057 B2* | 8/2003 | Mikubo | H01L 23/26 257/713 |
| 6,742,098 B1 | 5/2004 | Halbert et al. | |
| 6,976,848 B2* | 12/2005 | Choi | H05K 1/142 257/723 |
| 7,200,023 B2 | 4/2007 | Foster, Sr. | |
| 7,298,627 B2* | 11/2007 | Hussaini | H02J 7/0042 361/753 |
| 8,064,222 B2* | 11/2011 | Nishio | G06F 1/184 257/686 |
| 8,102,671 B2* | 1/2012 | Goldstein | H05K 7/1431 361/761 |
| 8,199,515 B2 | 6/2012 | Bandholz et al. | |
| 8,275,936 B1 | 9/2012 | Haywood et al. | |
| 8,866,023 B2 | 10/2014 | Kadri et al. | |
| 2008/0002370 A1 | 1/2008 | Lau et al. | |
| 2008/0052462 A1 | 2/2008 | Blakely et al. | |
| 2008/0304223 A1 | 12/2008 | Franz et al. | |
| 2009/0031078 A1 | 1/2009 | Warnes et al. | |
| 2009/0034216 A1 | 2/2009 | Petersen et al. | |
| 2011/0007473 A1 | 1/2011 | Franz et al. | |

(Continued)

*Primary Examiner* — Tuan T Dinh
(74) *Attorney, Agent, or Firm* — Fenwick & West LLP

(57) ABSTRACT

A computing system having a memory riser sub-system. The computing system includes a motherboard with a memory module connector and a riser card inserted into the first memory module connector. A first mezzanine card is connected to the riser card. The first mezzanine card includes a first mezzanine memory module connector for a first memory module and a second mezzanine memory module connector for a second memory module. A memory channel electrically connects the memory controller to the first mezzanine memory module connector and the second mezzanine module connector via the motherboard, the first riser card and the first mezzanine card. The memory channel may be divided into a first data sub-channel connected to the first mezzanine memory module connector and a second data sub-channel connected to the second mezzanine memory module connector.

17 Claims, 12 Drawing Sheets

(56) References Cited

U.S. PATENT DOCUMENTS

| | | |
|---|---|---|
| 2011/0149499 A1 | 6/2011 | Bandholz et al. |
| 2012/0020008 A1 | 1/2012 | Dunwoody et al. |
| 2012/0194992 A1 | 8/2012 | Bandholz et al. |
| 2012/0331219 A1 | 12/2012 | Cai |

* cited by examiner

MEMORY CAPACITY EXPANSION USING A MEMORY RISER

CROSS REFERENCE TO RELATED APPLICATION

This application claims priority from U.S. Provisional Patent Application No. 62/115,588, titled "Memory Capacity Expansion Using a Memory Riser" and filed Feb. 12, 2015, the contents of which are incorporated by reference in its entirety.

BACKGROUND

The capacity of a memory channel can be increased by increasing the number of DIMMS attached to a memory channel. However, as the number of DIMMs per channel is increased, the bandwidth of the memory channel degrades and results in a loss in memory system performance. The degradation is due to increased loads, via-trace coupling, trace-trace coupling, and insertion loss.

BRIEF DESCRIPTION OF THE DRAWINGS

The teachings of the embodiments herein can be readily understood by considering the following detailed description in conjunction with the accompanying drawings.

DETAILED DESCRIPTION OF EMBODIMENTS

Reference will now be made in detail to several embodiments of the present disclosure, examples of which are illustrated in the accompanying figures. It is noted that wherever practicable similar or like reference numbers may be used in the figures and may indicate similar or like functionality. The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

Embodiments of the present disclosure relate to a computing system that utilizes a riser card sub-system to expand the memory capacity of the computing system while maintaining memory system performance. In one embodiment, the computing system comprises a memory controller. The computing system includes a motherboard including a first memory module connector and a first riser card inserted into the first memory module connector. A first mezzanine card is connected to the riser card. The first mezzanine card includes a first mezzanine memory module connector for a first memory module and a second mezzanine memory module connector for a second memory module. A memory channel electrically connects the memory controller to the first mezzanine memory module connector and the second mezzanine module connector via the motherboard, the first riser card and the first mezzanine card.

The memory channel can include a command and address channel and a data channel. To reduce loading on the data channel due to the additional memory modules of the mezzanine card, the data channel is split into a first data sub-channel (e.g. for 36 data bits) and a second data sub-channel (e.g., for 36 data bits). The first data sub-channel electrically connects the memory controller to the first mezzanine memory module connector but not the second mezzanine module connector. The second data sub-channel electrically connects the memory controller to the second mezzanine memory module connector but not the first mezzanine module connector. Additionally, to reduce the loading on the command and address channel, a command and address buffer may be included in the riser card or the mezzanine card.

Figure 1:
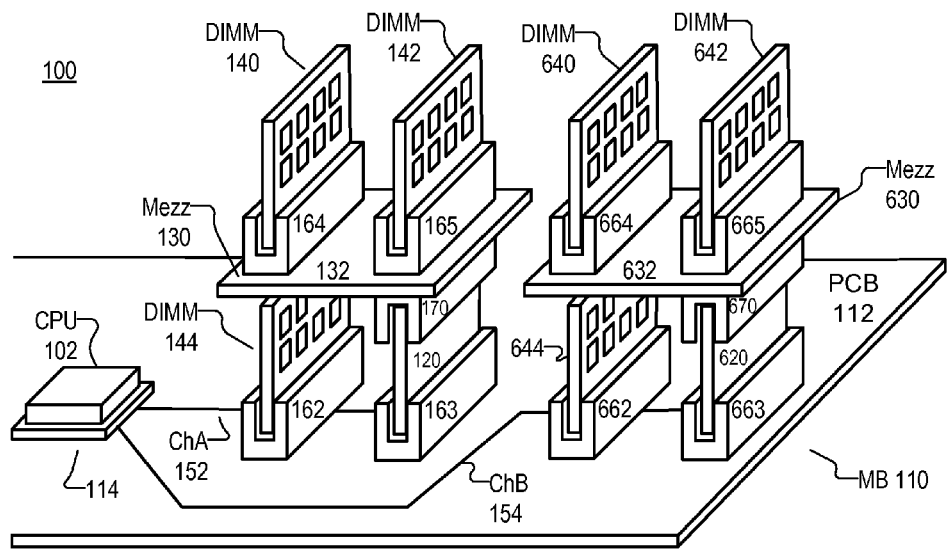
FIG. 1 is a computing system, according to an embodiment of the present disclosure.

FIG. 1 is a computing system 100, according to an embodiment of the present disclosure. Computing system 100 may be part of a computing device, such as a server or desktop computer. Computing system 100 includes a central processing unit (CPU), motherboard 110, riser cards 120 and 620, mezzanine cards 130 and 630, and several dual inline memory modules (DIMMs) 140, 142, 144, 640, 642, 644.

DIMMs 140, 142, 144, 640, 642, 644 are memory modules that store data across multiple memory chips. The memory chips typically store the data using dynamic random access memory (DRAM). In other embodiments the memory chips may store data in non-volatile memory (NVRAM). At least some of the DIMMS, such as DIMM 140, 142, 640 and 642 are typically dynamic point to point (DPP) DIMMs. DPP DIMMs will be explained in greater detail by reference to FIGS. 3A and 3B.

The motherboard 110 includes several components, such as a printed circuit board (PCB) 112, DIMM connectors 162, 163, 662 and 663, and a CPU socket 114. CPU socket 114 is surface mounted to the PCB and is adapted to receive and hold CPU 102 to the motherboard 110. CPU 102 is an integrated circuit (IC) with an integrated memory controller. Examples of CPUs 102 include INTEL, AMD, ARM and IBM branded processors. Memory controller is a circuit that manages the flow of data to and from the DIMMs. The memory controller supports multiple memory channels 152 and 154. Memory channel A 152 represents the communications pathway between the CPU 102 and the DIMMs 140, 142 and 144. Memory channel B 154 represents the communications pathway between the CPU 102 and the DIMMs 640, 642 and 644. In other embodiments, CPU 102 may also be replaced with another type of IC that includes a memory controller, such as a memory controller hub that connects a CPU to memory.

DIMM connectors 162, 163, 662 and 663 are mounted to the motherboard 110, such as with surface mounting, through-hole mounting, or press-fit mounting. Examples of DIMM connectors are DIMM slots having a large number of connector pins (e.g., 288 pins) and latches to hold DIMMs in place. DIMMs or riser cards may be plugged into any of the DIMM connectors 162, 163, 662 and 663 depending on the desired configuration of the computing system 100. Only two memory channels 152 and 154 and four DIMM connectors 162, 163, 662 and 663 are shown in FIG. 1 for ease of illustration. In other embodiments there may be three or more memory channels and additional DIMM connectors for the additional memory channels. Additionally, although only two DIMM connectors are shown for each memory channel 152 and 154 in FIG. 1, in other embodiments each memory channel 152 and 154 can be connected to a larger number (e.g., 4, 6, 8) of DIMM connectors.

Riser card 120 may be a rectangular shaped PCB that is approximately the same size as DIMM 144. The bottom edge of the riser card 120 is detachably inserted into and is held in place by DIMM slot 163, which causes riser card 120 to be oriented substantially perpendicular to the motherboard 110. The top edge of the riser card 120 is inserted into a riser card connector 170 of the mezzanine card 130. The riser card 120 includes conductive traces to carry signals of memory channel A 152 between the motherboard 110 and the mezzanine card 130.

Mezzanine card 130 includes a mezzanine PCB 132, two DIMM connectors 164 and 165, and a riser card connector 170. Mezzanine card 130 may also be referred to as a mezzanine riser board. PCB 132 is rectangular in shape and includes conductive traces (not shown) to carry electrical signals of memory channel A 152 between riser card connector 170 and DIMM connectors 164 and 165. The electrical connections within the mezzanine PCB 132 will be later explained by reference to FIG. 2.

DIMM connectors 164 and 165 are surface mounted to a top side of the mezzanine PCB 132. In other embodiments the DIMM connectors 164 and 165 may be through-hole or press-fit connectors. The spacing between the DIMM connectors 164 and 165 may be substantially the same as the spacing between the DIMM connectors 162 and 163. DIMMs 140 and 142 are inserted into respective DIMM connectors 164 and 165 and are oriented vertically. In other embodiments, DIMM connectors 164 and 165 may hold DIMMs horizontally or at an angle.

Riser card connector 170 is surface mounted to a bottom side of the mezzanine PCB 132. Riser card connector 170 may be located directly beneath DIMM connector 165. The riser card connector 170 is detachably connected to the riser card 120, and causes the mezzanine card 130 to be oriented substantially perpendicular to the riser card 120 and substantially parallel to the motherboard 110. Riser card connector 170 may be the same type of connector as DIMM connectors 164 and 165.

Together, the riser card 120 and mezzanine card 130 form a memory riser subsystem that allows multiple DIMMs 140 and 142 to be accessed through a single DIMM connector 163, thereby expanding the memory capacity of the computing system 100 by 1.5×. The riser card 120 and mezzanine card 130 can also be used without substantial changes to the motherboard 110 since DIMM connector 163 is a normal DIMM slot that is typically filled with a DIMM.

The riser card 120 is as tall as or taller than DIMM 144, which raises the mezzanine card 130 well above the motherboard 110. Specifically, mezzanine DIMM connector 164 is located over DIMM connector 162 and DIMM 144, but is raised enough so that it does not interfere with DIMM 144. This allows riser card 120 and mezzanine card 130 to be utilized in conjunction with DIMM 144.

Similarly, riser card 620 and mezzanine card 630 form another memory riser subsystem that is connected to DIMM connector 663, and allows multiple DIMMs 640 and 642 to be accessed via memory channel B 154 through a single DIMM connector 663.

Riser card 620 may be a rectangular shaped PCB that is approximately the same size as DIMM 644. The bottom edge of the riser card 620 is detachably inserted into and is held in place by DIMM connector 663, which causes riser card 620 to be oriented substantially perpendicular to the motherboard 110. The top edge of the riser card 620 is inserted into a riser card connector 670 of the mezzanine card 630. The riser card 620 includes conductive traces to carry signals of memory channel B 154 between the motherboard 110 and the mezzanine card 630.

Mezzanine card 630 includes a mezzanine PCB 632, two DIMM connectors 664 and 665, and a riser card connector 670. PCB 132 is rectangular in shape and includes conductive traces to carry electrical signals of memory channel B 154 between riser card connector 670 and DIMM connectors 664 and 665.

DIMM connectors 664 and 665 are surface mounted to a top side of the mezzanine PCB 632. In other embodiments the DIMM connectors 664 and 665 may be through-hole connectors. The spacing between the DIMM connectors 664 and 665 may be substantially the same as the spacing between the DIMM connectors 662 and 663. DIMMs 640 and 642 are inserted into respective DIMM connectors 664 and 665.

Riser card connector 670 is surface mounted to a bottom side of the mezzanine PCB 632. Riser card connector 670 may be located directly beneath DIMM connector 665. The riser card connector 670 is detachably connected to the riser card 620, and causes the mezzanine card 630 to be oriented substantially perpendicular to the riser card 620 and substantially parallel to the motherboard 110. Riser card connector 670 may be the same type of connector as DIMM connectors 664 and 665.

Additionally, the electrical connections of the memory channel A 152 within the riser card 120 and mezzanine card 130 allow DIMMs 140 and 142 to be added without decreasing the speed of the memory channel A 152. The electrical connections of the memory channel B 154 within the riser card 620 and mezzanine card 630 allow DIMMs 640 and 642 to be added without decreasing the speed of the memory channel B 154. The electrical connections are now explained in greater detail by reference to FIG. 2.

Figure 2:
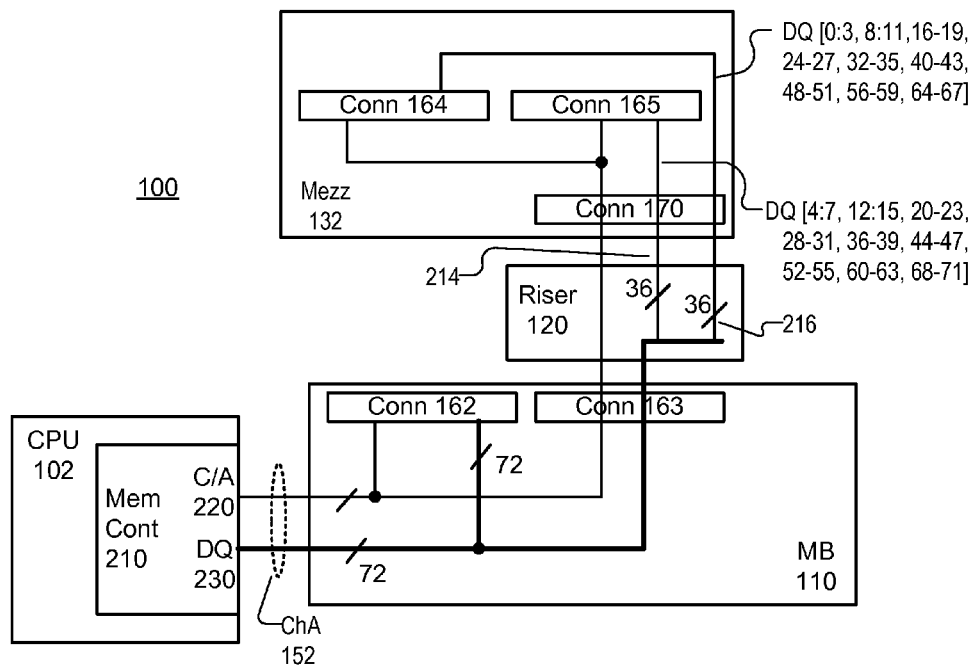
FIG. 2 illustrates electrical connections in the computing system of FIG. 1, according to an embodiment of the present disclosure.

FIG. 2 illustrates electrical connections in the computing system 100 of FIG. 1, according to an embodiment of the present disclosure. The electrical connections are only shown for memory channel A 152, but the same electrical connections and description would also apply for memory channel B 154.

The CPU 102 includes a memory controller 210 that transmits signals across and receives signals from a memory channel A 152. Memory channel A 152 electrically connects memory controller 210 to motherboard DIMM connectors 162 and 163. Memory channel A 152 also electrically connects memory controller 210 to mezzanine DIMM connectors 164 and 165 (and corresponding DIMMs in those connectors) via the motherboard 110, riser card 120, and mezzanine card 130. The memory channel A 152 can be comprised of conductive signal traces routed on motherboard 110, riser card 120, mezzanine card 130, and can also be comprised of other conductive components (e.g. connector pins, signal buffers, etc.).

Memory channel A 152 is divided into a command and address (C/A) channel and a data channel 230. C/A channel 220 carries C/A signals transmitted by the memory controller 210. C/A signals include, for example, chip select (CS), clock enable (CKE), address, bank address (BA), bank group (BG), row activate (ACT), row access strobe (RAS), column address strobe (CAS) and on die termination (ODT) signals, among others. C/A channel 220 electrically connects the memory controller 210 to both mezzanine DIMM connectors 164 and 165 so that the DIMMs plugged into these connectors 164 and 165 can be controlled by the memory controller 210.

Data channel 230 carries multiple data signals in parallel to and from the memory controller 210. For example, the data channel 230 can be 72 bits wide, and carry 64 bits of memory data and 8 bits of error correcting code (ECC) data. The data channel 230 may also carry data strobe signals (DQS, not shown) for the data, which would increase the number of signals in the data channel 230. The data channel 230 can be divided into multiple data sub-channels 214 and 216 at the riser card 120. Each data sub-channel 214 and 216 includes a subset of data bits from the data channel 230. Data sub-channel 214 includes data bits DQ[0:3, 8:11, 16-19, 24-27, 32-35, 40-43, 48-51, 56-59, 64-67]. Data sub-channel 216 includes data bits DQ[4:7, 12:15, 20-23, 28-31, 36-39, 44-47, 52-55, 60-63, 68-71].

Each data sub-channel 214 and 216 is only electrically connected to one of the mezzanine DIMM connectors 164 and 165. Data sub-channel 214 is connected to mezzanine DIMM connector 165 but not mezzanine DIMM connector 164. Data sub-channel 216 is connected to mezzanine DIMM connector 164 but not mezzanine DIMM connector 165. Thus, half the data channel 230 is connected to one mezzanine DIMM connector 164, while the other half of the data channel 230 is connected to the other mezzanine DIMM connector 165. This allows two DIMMs (i.e. the DIMMS plugged into DIMM connectors 164 and 165) to be accessed through a single DIMM connector 163 without increasing the loading on the data channel 230 when compared to plugging a single DIMM into DIMM connector 163.

Each mezzanine DIMM 140 or 142 (from FIG. 2) is thus connected to a single data sub-channel 214 or 216. To allow access to all the memory chips of a mezzanine DIMM 140 and 142, DIMMs 140 and 142 can be DPP DIMMs. DPP DIMMs include DPP data buffers that can mux data pins of the memory chips (e.g. 72 data pins) to half a memory channel (e.g. to 36 data bits), thereby allowing all of the storage space in the memory chips to be accessed through only half a memory channel.

Referring back to FIG. 1, the routing of memory channel B 154 through riser card 620 and mezzanine card 630 is similar to the routing of memory channel A 152 through riser card 120 and mezzanine card 130. Specifically, memory channel B 154 has a C/A channel (not shown) electrically connected to both DIMM connectors 664 and 665. Memory channel B 154 has a data sub-channel (not shown) electrically connected to DIMM connector 664 but not DIMM connector 665. Memory channel B 154 has another data sub-channel (not shown) electrically connected to DIMM connector 665 but not DIMM connector 664.

Figure 3A:
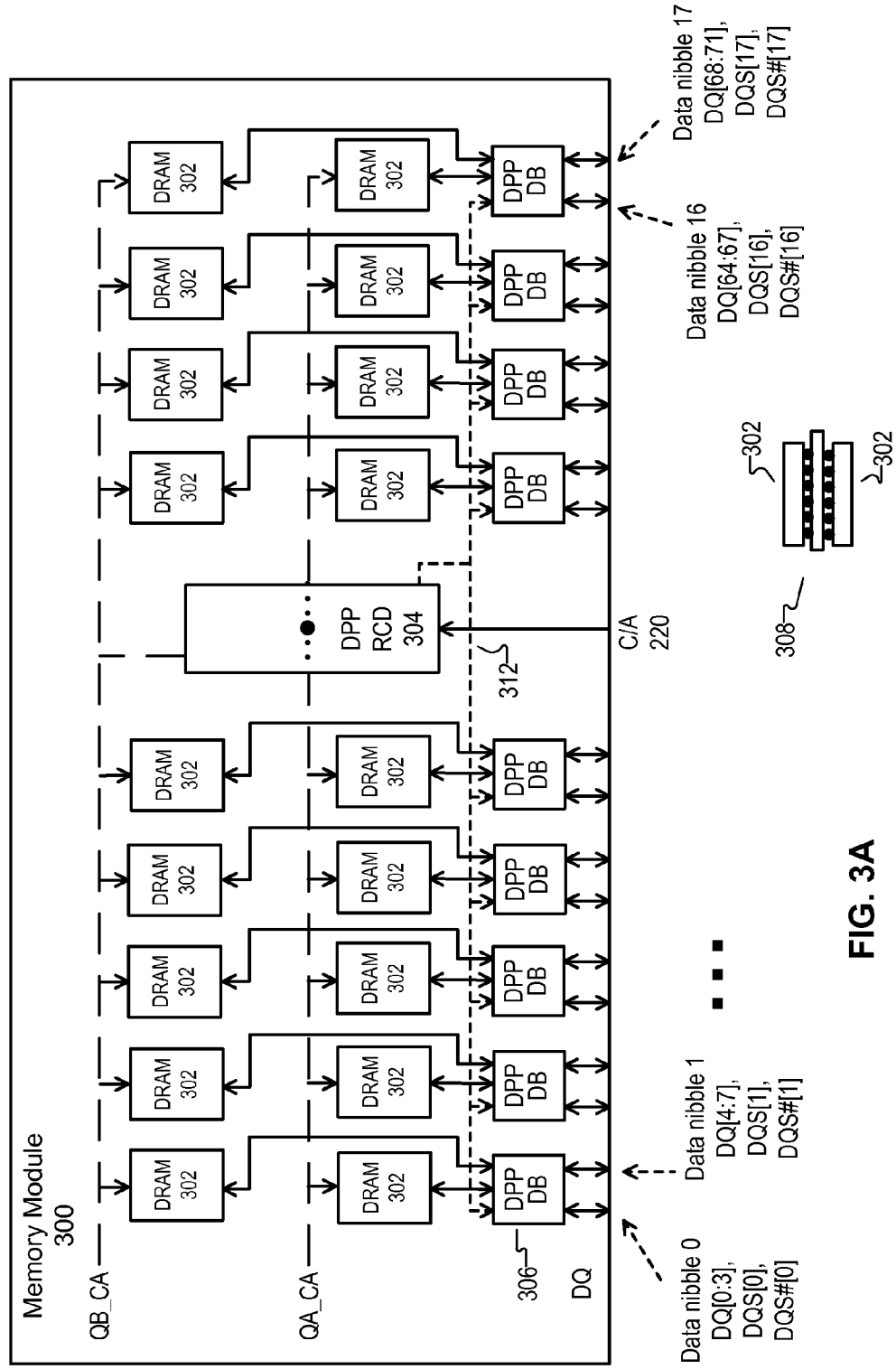
FIG. 3A is dynamic point to point memory module, according to an embodiment of the present disclosure.

FIG. 3A is dynamic point to point memory module 300, according to an embodiment of the present disclosure. Memory module 300 may be used, for example, as DIMM 140, 142, 144, 640, 642 or 644 from FIG. 1. Memory module 300 includes 36 DRAM chips 302, with 18 DRAM chips 302 on one side and 18 DRAM chips 302 on the opposite side interconnected in a clamshell configuration 308. Only one side of the memory module 300 with 18 DRAM chips 302 is shown in FIG. 3A. DRAM chips 302 are integrated circuits (ICs) storing data.

Memory module 300 also includes a DPP registered clock driver (RCD) 304 and nine DPP data buffers (DB) 306. DPP RCD 304 and DPP DBs 306 are typically separate IC's, but could be combined into one in other embodiments. DPP RCD 304 is coupled to the C/A channel 220. DPP RCD 304 receives C/A signals from the C/A channel 220 and buffers the C/A signals into buffered C/A signals QA_CA and QB_CA. The DPP RCD 304 provides the buffered C/A signals QB_CA and QA_CA to the DRAM chips 302. The DPP RCD 304 also generates DPP buffer control signals 312 to control the routing of signals through the DPP data buffers 306.

The DPP data buffers 306 include multiplexing logic to route data between the pins of the memory module 300 and the DRAM chips 302. Each DPP data buffer 306 can selectively route data for any one of two "data nibbles" to any one of two DRAM chips 302 connected to the DPP data buffer 306. Each data nibble includes four bits of data. For example, the leftmost DPP data buffer 306 can route data for either data nibble 0 or data nibble 1 to either the leftmost DRAM chip 302 in the top DRAM row or the leftmost DRAM chip 302 in the bottom DRAM row. As another example, the rightmost DPP data buffer 306 can route data for either data nibble 16 or data nibble 17 to either the rightmost DRAM chip 302 in the top DRAM row or the rightmost DRAM chip 302 in the bottom DRAM row.

The routing of DPP data buffers 306 can be controlled by commands sent by the memory controller 210 over the C/A bus. The memory controller 210 can determine how to set the routing of the DPP buffers 306 depending on whether the memory module 300 is connected to data sub-channel 214 or data sub-channel 216. The memory controller 210 then sends a data buffer routing command to the DPP RCD 304, and the DPP RCD 304 sets the routing of the DPP data buffers 306 in accordance with the command. For example, if the memory module 300 is DIMM 140 (from FIG. 1) inserted into mezzanine DIMM connector 164, the DPP data buffers 306 would be set to route data from the DIMM pins corresponding to data sub-channel 216 (e.g., even data nibbles). On the other hand, if the memory module is DIMM 142 (from FIG. 1) inserted into mezzanine DIMM connector 165, the DPP data buffers 306 would be set to route data from the DIMM pins corresponding to data sub-channel 214 (e.g., odd data nibbles).

Figure 3B:
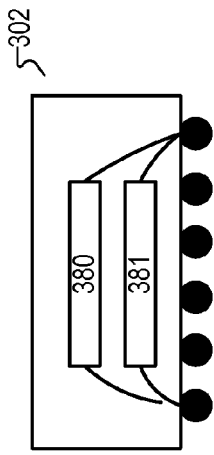
FIG. 3B is a DRAM chip, according to an embodiment.

FIG. 3B is a DRAM chip 302, according to an embodiment. The DRAM chip 302 includes multiple dies 380 and 381 that are stacked on each other in a single package. Each of the memory dies is connected in parallel to the pins of the package using wirebonds.

Figure 3C:
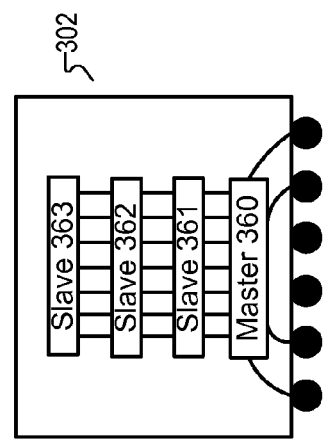
FIG. 3C is a DRAM chip, according to another embodiment.

FIG. 3C is a DRAM chip 302, according to another embodiment. The DRAM chip 302 is a 3 dimension stacked (3DS) memory chip that includes multiple dies 360, 361, 362 and 363 stacked on each other in a single package. Each 3DS chip 302 includes a master die 360 that is connected to the pins of the package using wirebonds. The master die 360 buffers data and address signals and passes the buffered signals to the slave dies 361, 362, 363 so that the slave dies 361, 362, 363 do not appear as an external load.

Figure 3D:
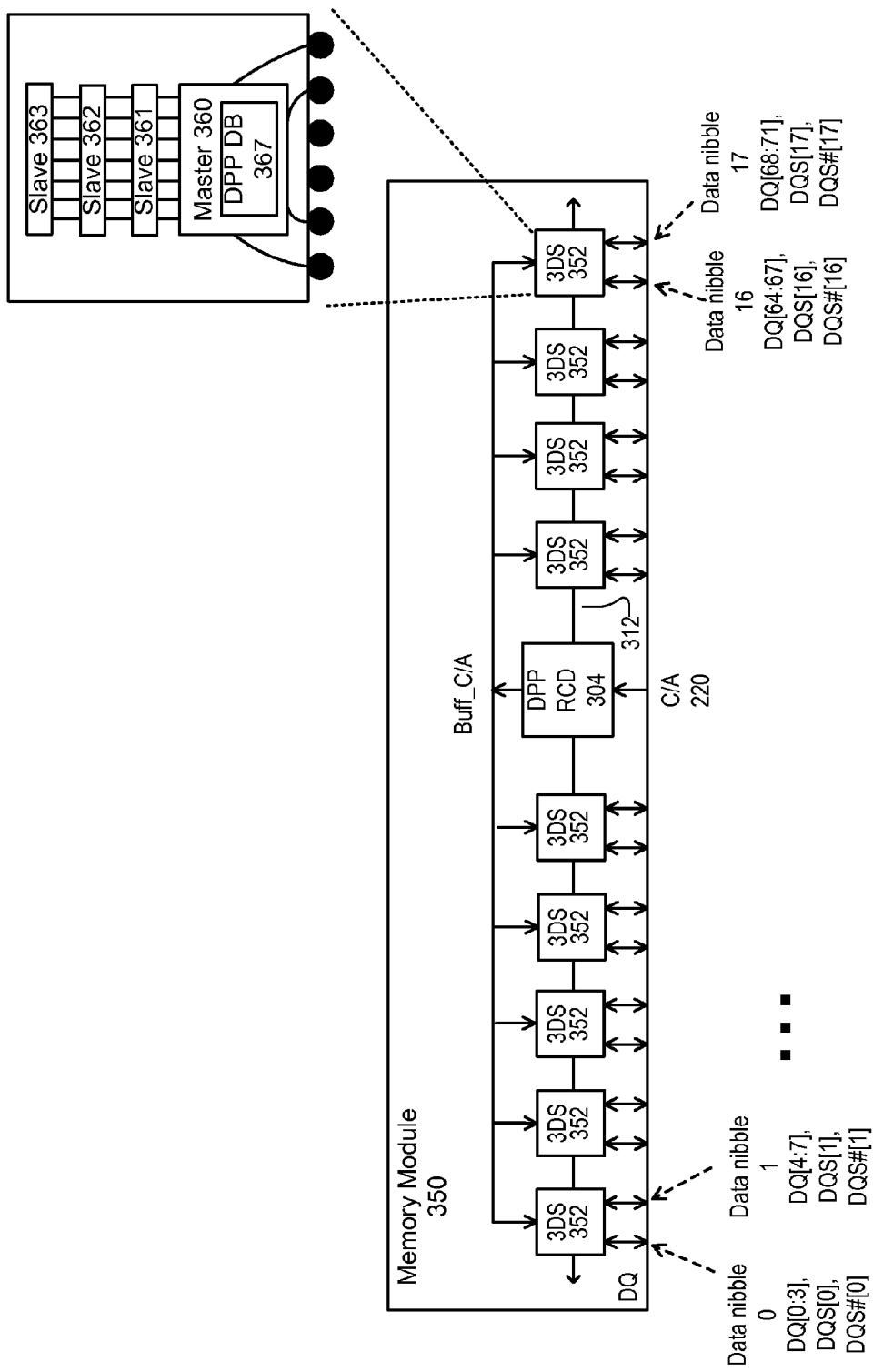
FIG. 3D is dynamic point to point memory module, according to another embodiment of the present disclosure.

FIG. 3D is dynamic point to point memory module 350, according to another embodiment of the present disclosure. Memory module 350 is similar to memory module 300, but no longer includes a separate DPP DB 306. Instead, the memory module 350 includes 3DS memory chips 352 and builds the functionality of the DPP DB 306 into the memory chips 352. Specifically, the master die 360 now includes a DPP data buffer 367 that can selectively route data for any one of two data nibbles to any one of the slave dies 361, 362 and 363.

Figure 4A:
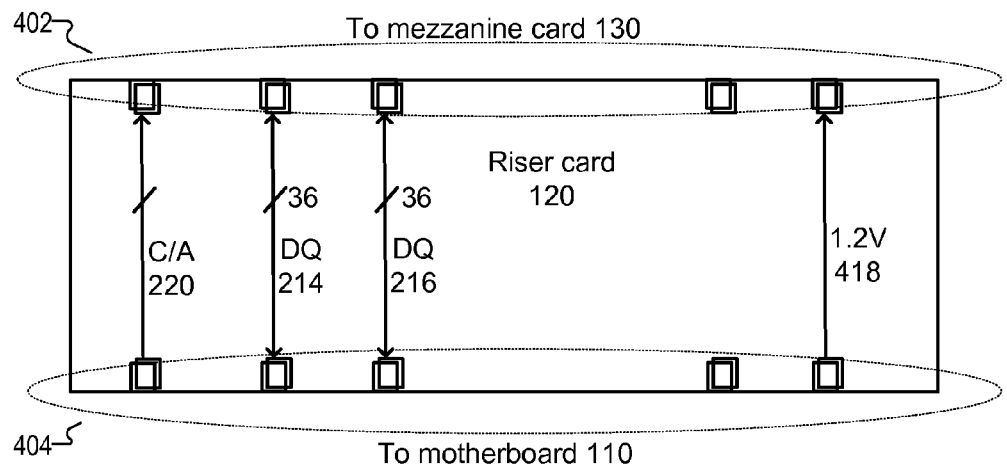
FIG. 4A is a riser card, according to an embodiment of the present disclosure.

FIG. 4A is a riser card 120, according to an embodiment of the present disclosure. Riser card 120 can be a PCB and have a rectangular shape, similar to the shape of a DIMM. Riser card 120 include several pins 404 (e.g. 288 pins) on the lower edge of card for connecting to DIMM connector 163 (from FIG. 1). Riser card 120 also includes several pins 402 (e.g. 288 pins) on the upper edge of the card for connecting to riser card connector 170. This embodiment of riser card 120 is essentially a pass-through card that passes all signals and supply voltages between the lower pins 404 and the upper pins 402.

Riser card 120 includes several conductive traces that carry signals between the lower pins 404 and the upper pins 402. The traces include a group of traces for the C/A channel 220. The traces include a group of traces for one data sub-channel 214 and another group of traces for another data sub-channel 216. The riser card 120 also includes conductive material (e.g. in the form of power traces or a power plane) carrying a 1.2 low supply voltage 418 from the lower pins 404 to the upper pins 402. Supply voltage 418 is used to supply power to the mezzanine DIMMs 140 and 142.

Riser card 120 may also have other electrical connections not shown in FIG. 4A. For example, the riser card 120 can have conductive material to carry return path currents between motherboard 110 and the mezzanine card 130. The riser card 120 can have conductive material to carry other supply voltages from the lower pins 404 to the upper pins 402, such as a 2.5V supply voltage.

Figure 4B:
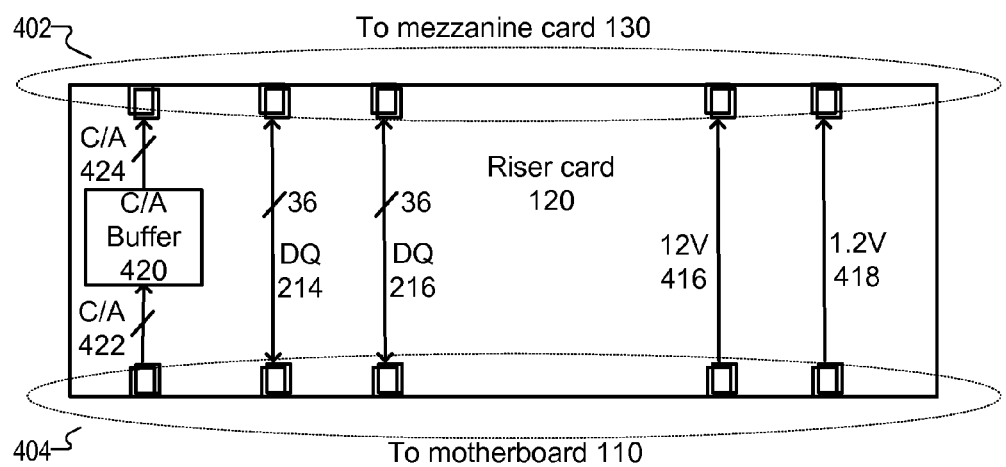
FIG. 4B is a riser card, according to another embodiment of the present disclosure.

FIG. 4B is a riser card, according to another embodiment of the present disclosure. The riser card 120 of FIG. 4B is similar to the riser card 120 of FIG. 4A, but now includes an additional C/A buffer 420. C/A buffer 420 is a buffer that can buffer C/A signals from a primary portion 422 of the C/A channel and to a secondary portion 424 of the C/A channel. The C/A buffer 420 allows the two DIMMs 140 and 142 connected to the mezzanine card 130 to appear as a single load to the CPU 102. C/A buffer 420 may be a zero delay buffer.

Figure 4C:
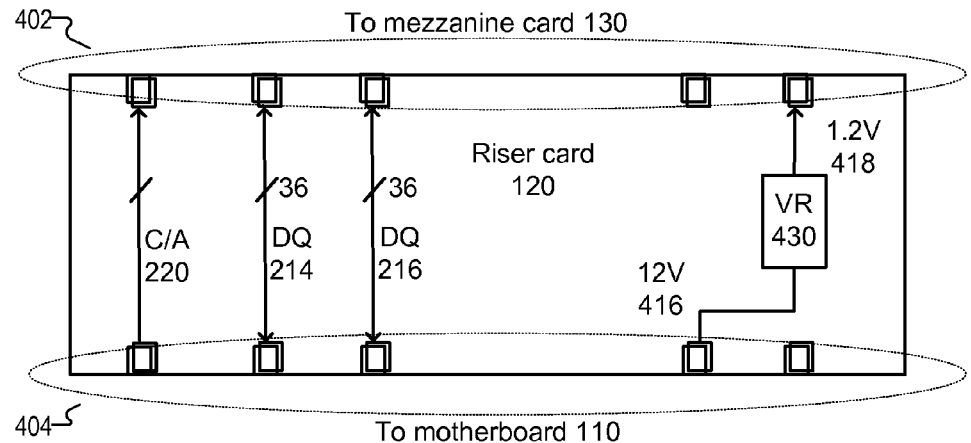
FIG. 4C is a riser card, according to yet another embodiment of the present disclosure.

The riser card 120 also includes conductive material (e.g. in the form of power traces or a power plane) carrying a 12V high supply voltage 416 from the lower pins 404 to the upper pins 402. Supply voltage 416 may eventually be converted into a lower supply voltage for the mezzanine DIMMs 140 and 142 as will be described herein FIG. 4C is a riser card 120, according to yet another embodiment of the present disclosure. The riser card 120 of FIG. 4C is similar to the riser card 120 of FIG. 4A, but now includes a voltage regulator 430. Voltage regulator 430 is a circuit that converts a 12V high supply voltage 416 from the MB 110 into a 1.2V low supply voltage 418 for the DIMMs 140 and 142. Examples of voltage regulator 430 include switching regulators or linear regulators. This embodiment is appropriate when the DIMM connector 163 cannot provide sufficient current on the 1.2V low supply voltage rail 416 to power two DIMMs 140 and 142. In other embodiments the voltage regulator 430 can convert the 12V high supply voltage 416 into other voltages, such as a 2.5V supply voltage that is provided to the pins 402 through conductive material.

Figure 4D:
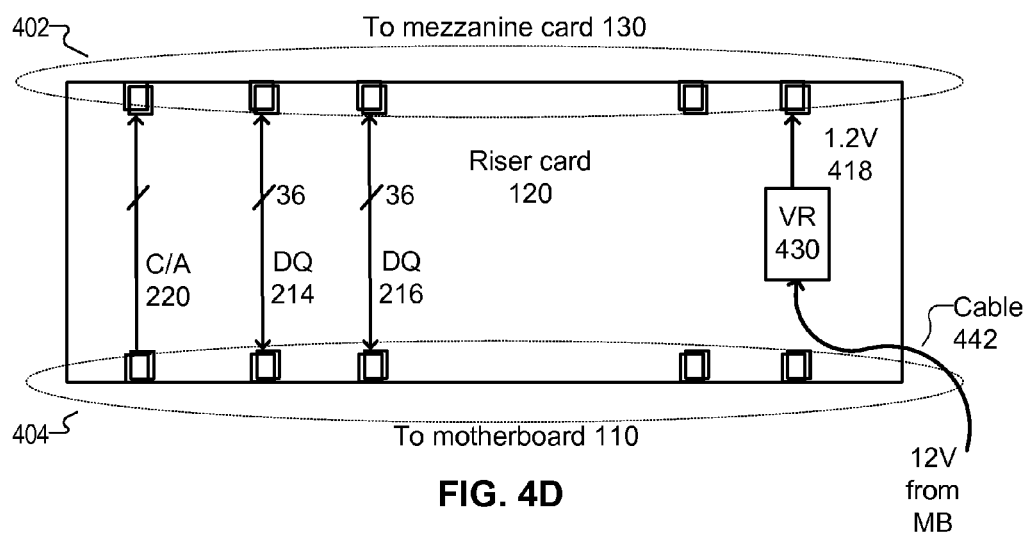
FIG. 4D is a riser card, according to a further embodiment of the present disclosure.

FIG. 4D is a riser card 120, according to a further embodiment of the present disclosure. The riser card 120 of FIG. 4D is similar to the riser card 120 of FIG. 4C, but now the input of the voltage regulator 430 receives the 12V high supply voltage through a cable 442. One end of the cable 442 is attached to a cable connector on the riser card 120, and another end of the cable 442 is attached to a cable connector on the motherboard 110. This embodiment is appropriate when the DIMM connector 163 cannot provide sufficient current on the 12V high supply voltage rail 416 for the voltage regulator 440.

Figure 5A:
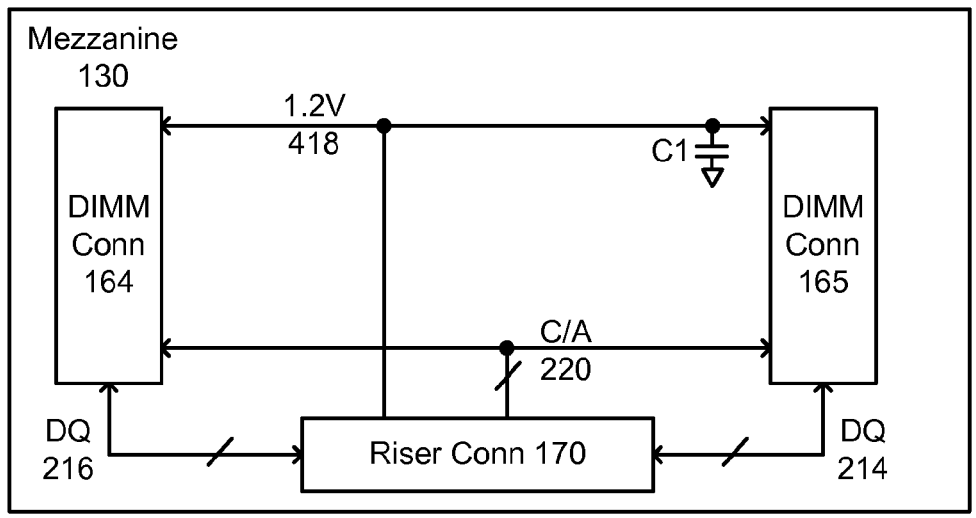
FIG. 5A is a mezzanine card, according an embodiment of the present disclosure.

FIG. 5A is a mezzanine card 130, according an embodiment of the preset disclosure. The mezzanine card 130 includes a group of traces for the C/A channel 220, a group of traces for one data sub-channel 214 and another group of traces for another data sub-channel 216. The mezzanine card 130 includes conductive material (e.g. in the form of power traces or a power plane) carrying a 1.2 low supply voltage 418 from riser connector 170 to DIMM connectors 164 and 165. A decoupling capacitor C1 is connected between the 1.2V low supply voltage 146 and ground. A decoupling capacitor C2 is connected between the 12V high supply voltage and ground.

Figure 5B:
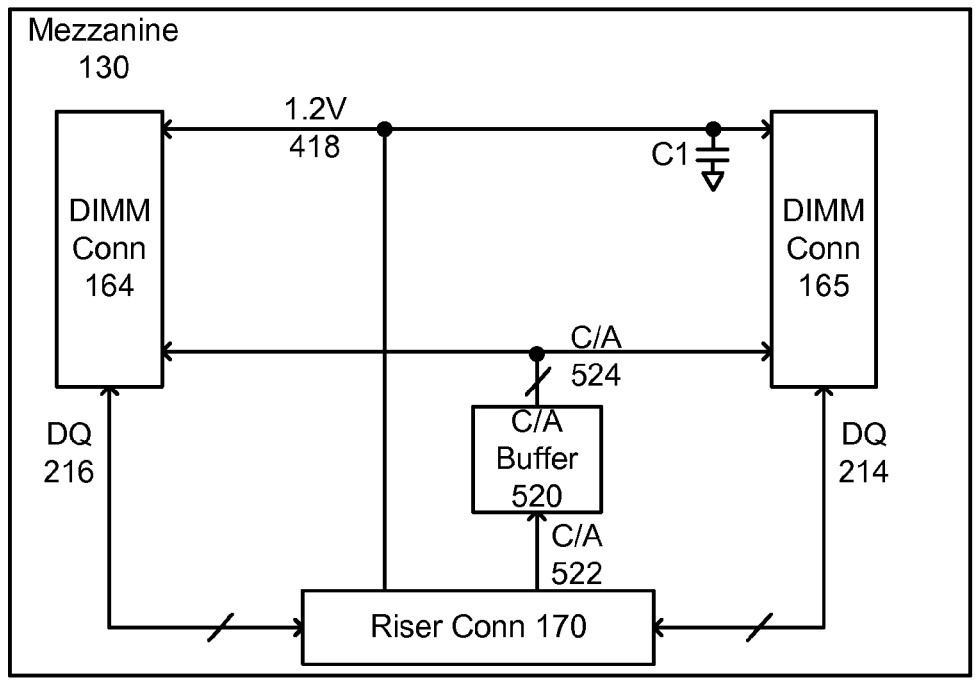
FIG. 5B is a mezzanine card, according to another embodiment of the present disclosure.

FIG. 5B is a mezzanine card 130, according to another embodiment of the present disclosure. The mezzanine card 130 now includes a C/A buffer 520. C/A buffer 520 is an IC that buffers C/A signals between a primary portion 522 of the C/A channel and a secondary portion 524 of the C/A channel.

Figure 5C:
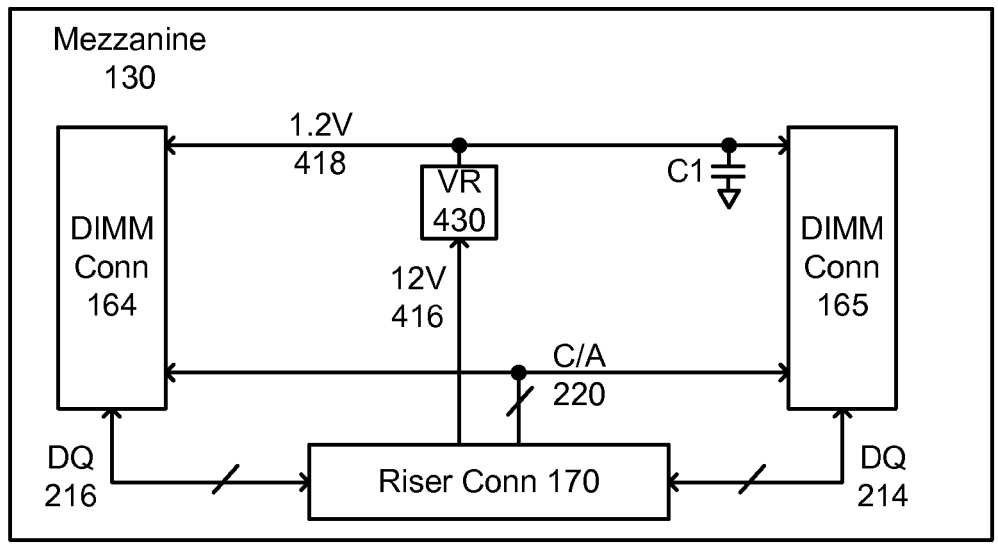
FIG. 5C is a mezzanine card, according to yet another embodiment of the present disclosure.

FIG. 5C is a mezzanine card 130, according to yet another embodiment of the present disclosure. The mezzanine card 130 includes conductive carrying a 12V high supply voltage 416 from riser connector 170 to the voltage regulator 430. Voltage regulator 430 converts the 12V high supply voltage 416 into a 1.2V low supply voltage 418 for DIMMs plugged into DIMM connectors 164 and 165. The voltage regulator 430 may be circuitry may be part of the mezzanine card 130. Alternatively, the voltage regulator 430 may be mounted on a voltage regulator board, and the voltage regulator board is then connected to the mezzanine board 130 through a connector.

Figure 5D:
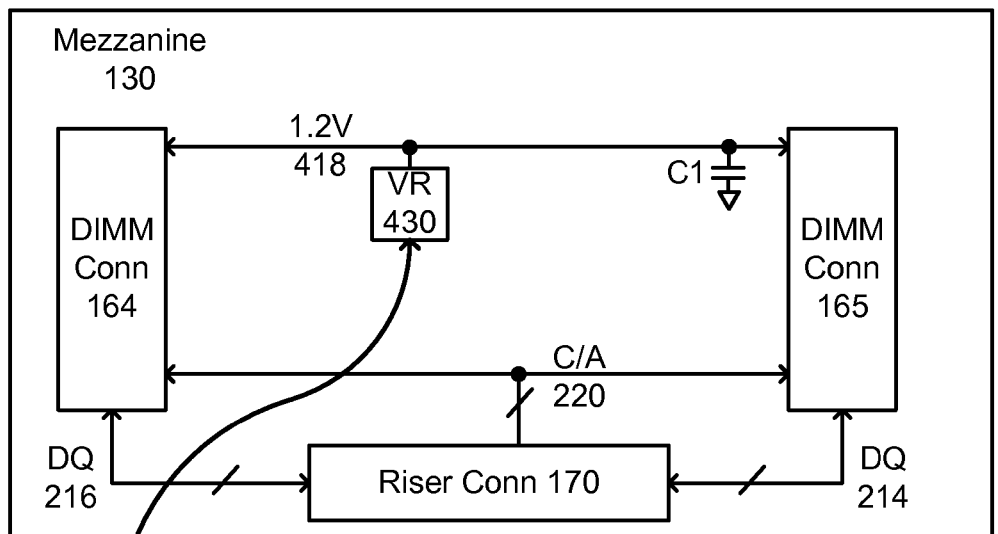
FIG. 5D is a mezzanine card, according to a further embodiment of the present disclosure.

FIG. 5D is a mezzanine card 130, according to a further embodiment of the present disclosure. The mezzanine card 130 includes a voltage regulator 430 receiving the 12V high supply voltage through a cable 542. One end of the cable 542 is connected to a cable connector of the mezzanine card 130, and the other end of the cable 542 is attached to a cable connector on the motherboard 110.

Figure 6A:
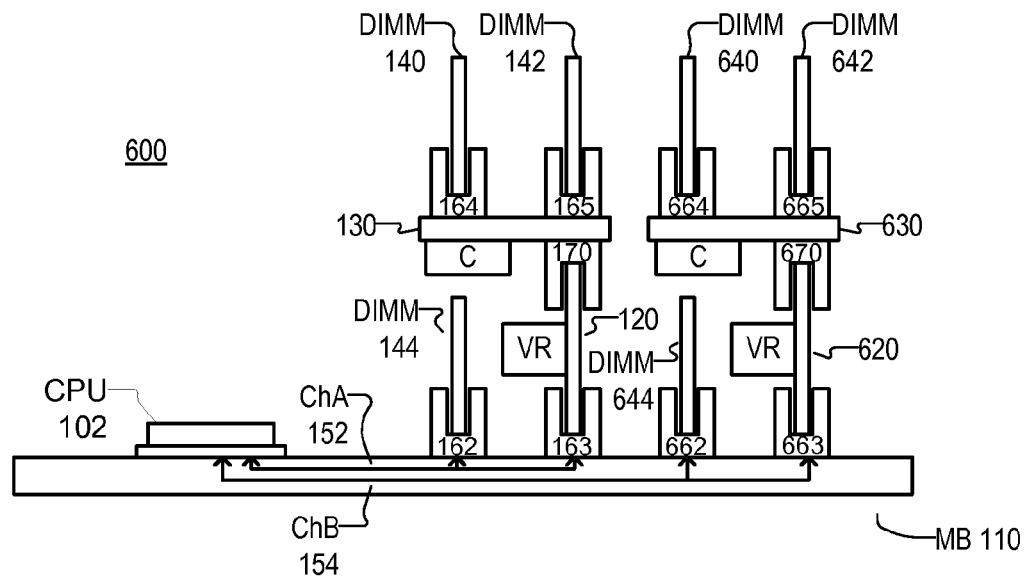
FIG. 6A is a side view of a computing system with two riser cards and two mezzanine cards and FIG. 6B is a top view of the computing system, according to an embodiment of the present disclosure.
Figure 6B:
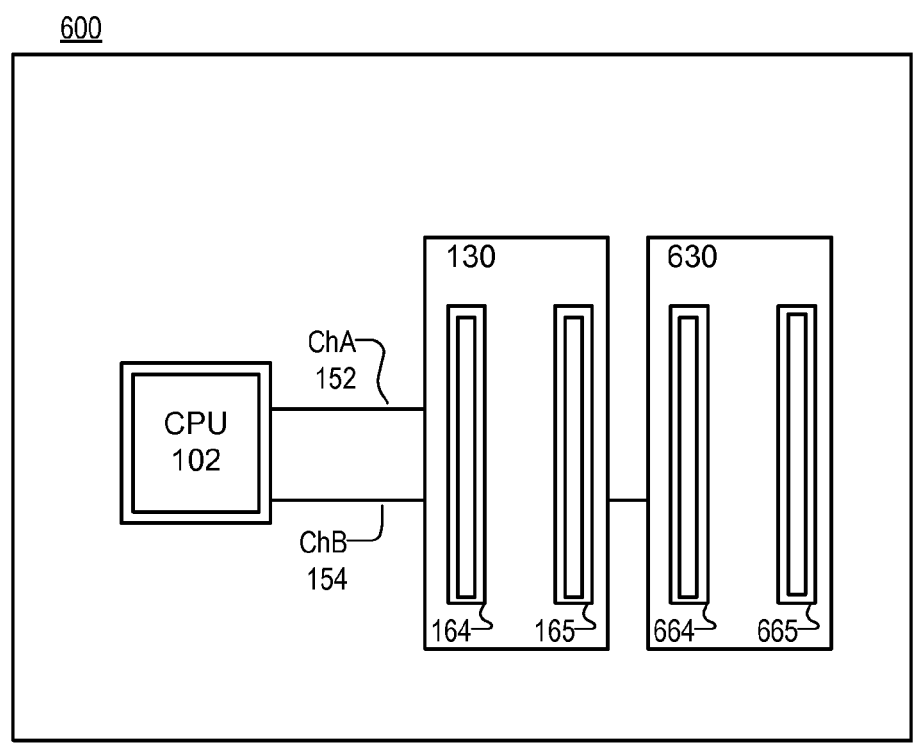

FIG. 6A is a side view of a computing system 600 with two riser cards 120 and 620 and two mezzanine cards 130 and 630 and FIG. 6B is a top view of the computing system 600, according to an embodiment of the present disclosure. The computing system 600 is similar to the computing system 100 of FIG. 1, but now includes capacitors C and voltage regulators VR.

Both riser cards 120 and 620 include their own voltage regulator VR to convert a high supply voltage (not shown) into a low supply voltage (not shown). For example, the voltage regulators VR may be the voltage regulators 430 from FIG. 4C or 4D. Each voltage regulator VR uses low profile components such that it does not extend past the gap between DIMM connectors (e.g. the between 162 and 163), which prevents the voltage regulator VR from interfering with an adjacent DIMM (e.g. DIMM 162).

Each mezzanine card 130 and 630 includes a decoupling capacitor C. The decoupling capacitor C can be, for example, capacitor C1 from FIG. 4A. The capacitor C is placed on the bottom side of the mezzanine card 130, directly below DIMM slot 164 and directly above DIMM 144 and DIMM connector 162. The decoupling capacitor C has a low profile such that it does not interfere with the DIMM 144 when the computing system 600 is fully assembled.

Figure 7A:
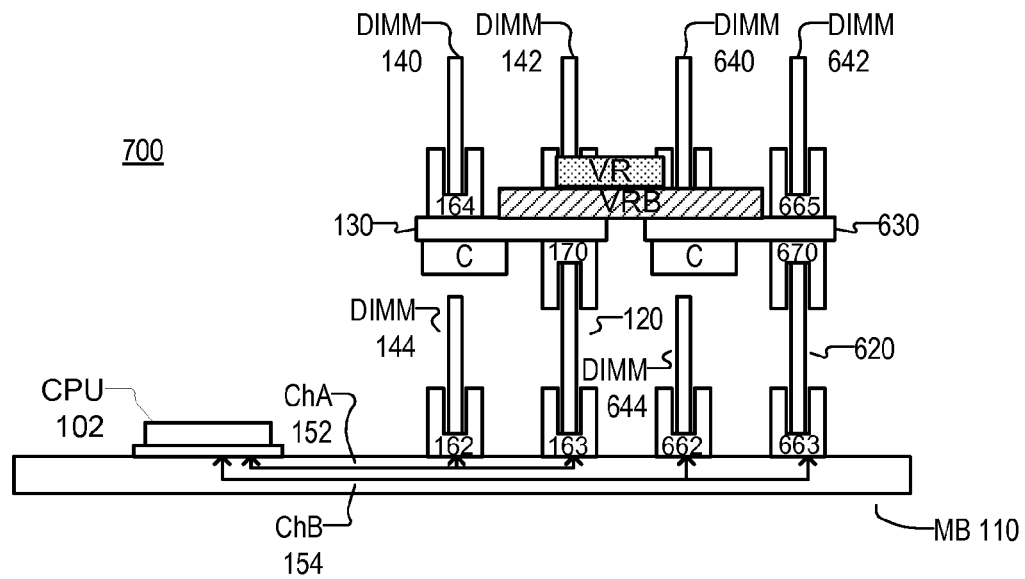
FIG. 7A is a side view of a computing system with two riser cards and two mezzanine cards.
Figure 7B:
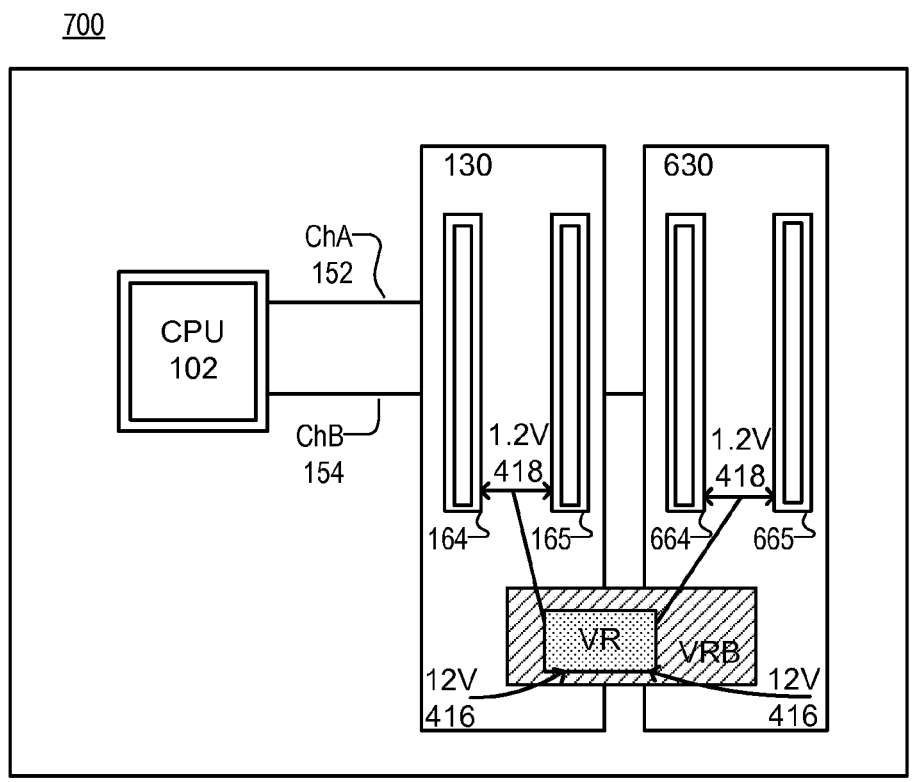
FIG. 7B is a top view of the computing system, according to another embodiment of the present disclosure.

FIG. 7A is a side view of a computing system 700 with two riser cards 120 and 620 and two mezzanine cards 130 and 630, and FIG. 7B is a top view of the computing system 700, according to another embodiment of the present disclosure. The computing system 700 is similar to the computing system 600 of FIG. 6, but now the voltage regulator VR is included on a separate voltage regulator board VRB. VRB is connected to both mezzanine cards 130 and 630, such as through detachable connectors or cables (not shown). Voltage regulator VR receives a high supply voltage 416 from both mezzanine cards 130 and 630. Voltage regulator VR converts the high supply voltage 416 into a low supply voltage 418, and returns the low supply voltage 418 to the mezzanine cards 130 and 630. In other embodiments, voltage regulator VR can receive the high supply voltage 416 from a cable (not shown) that is connected to the motherboard MB 110.

Figure 8A:
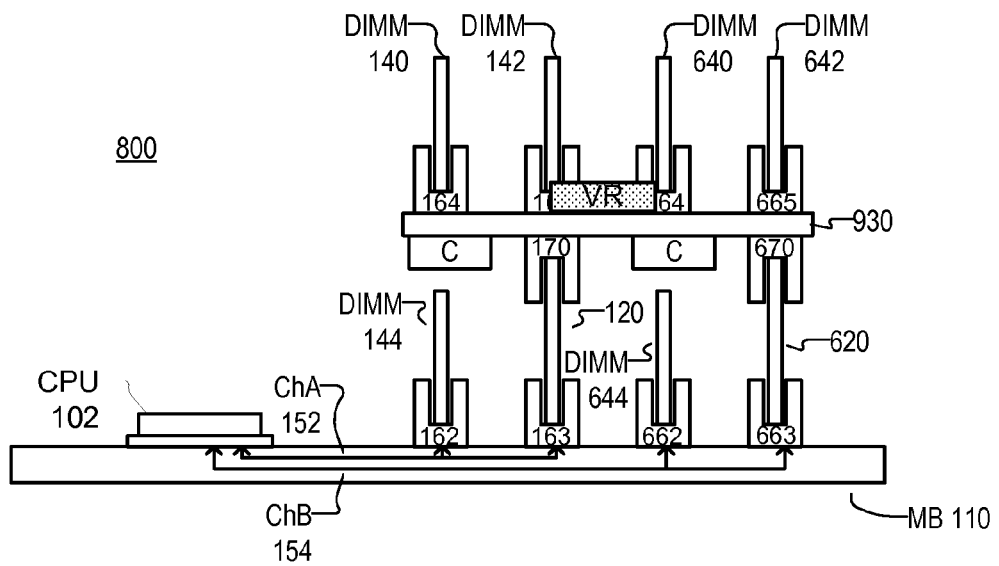
FIG. 8A is a side view of a computing system with two riser cards and one mezzanine card.
Figure 8B:
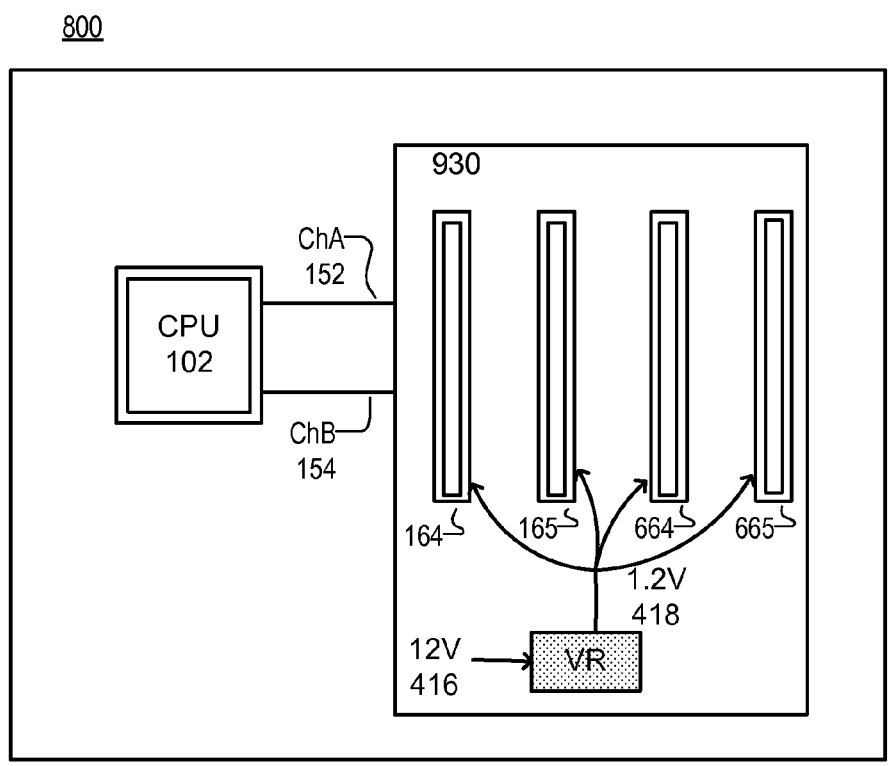
FIG. 8B is a top view of the computing system, according to another embodiment of the present disclosure.

FIG. 8A is a side view of a computing system 800 with two riser cards 120 and 620 and one mezzanine card 930, and FIG. 8B is a top view of the computing system 800, according to another embodiment of the present disclosure. Computing system 800 is similar to computing system 700 of FIG. 7A, but now includes a single mezzanine card 930 instead of two. Mezzanine card 930 is essentially two different mezzanine cards (e.g. 130 and 630) formed with a single PCB, but that includes the same signal routing for the memory channels 152 and 154 as the two separate mezzanine cards. 130 and 630.

The mezzanine card 930 includes four DIMM connectors 164, 165, 664 and 665, two riser card connectors 170 and 670, capacitors C, and voltage regulator VR. There is a single voltage regulator VR built into the mezzanine card 930. Voltage regulator VR converts the high supply voltage 416 into a low supply voltage 418. The low supply voltage 418 is carried to the DIMM connectors 164, 165, 664, 665 through a power plane or power traces (not shown). In other embodiments, voltage regulator VR can receive the high supply voltage 416 from a cable (not shown) that is connected to the motherboard MB 110.

Figure 9A:
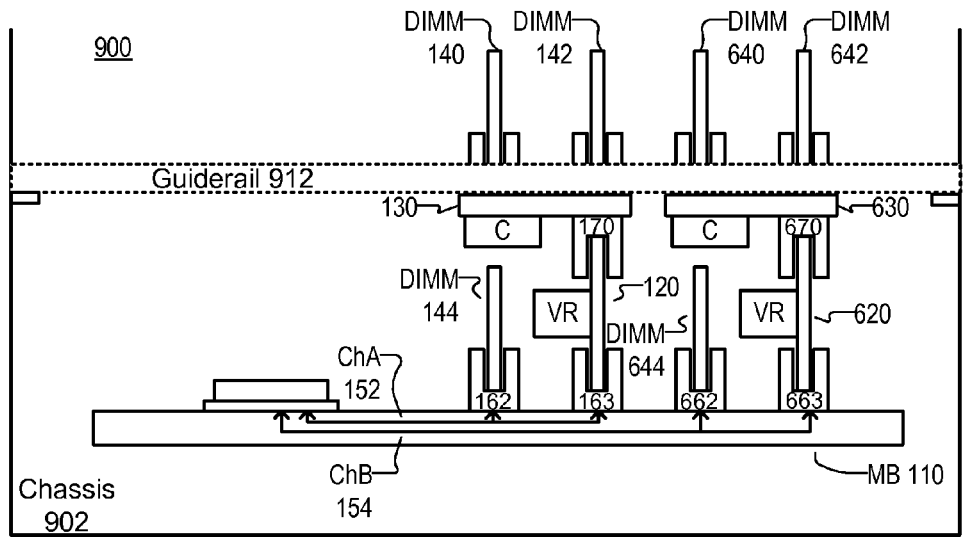
FIG. 9A is a side view of a computing system inside a chassis of a computing device.
Figure 9B:
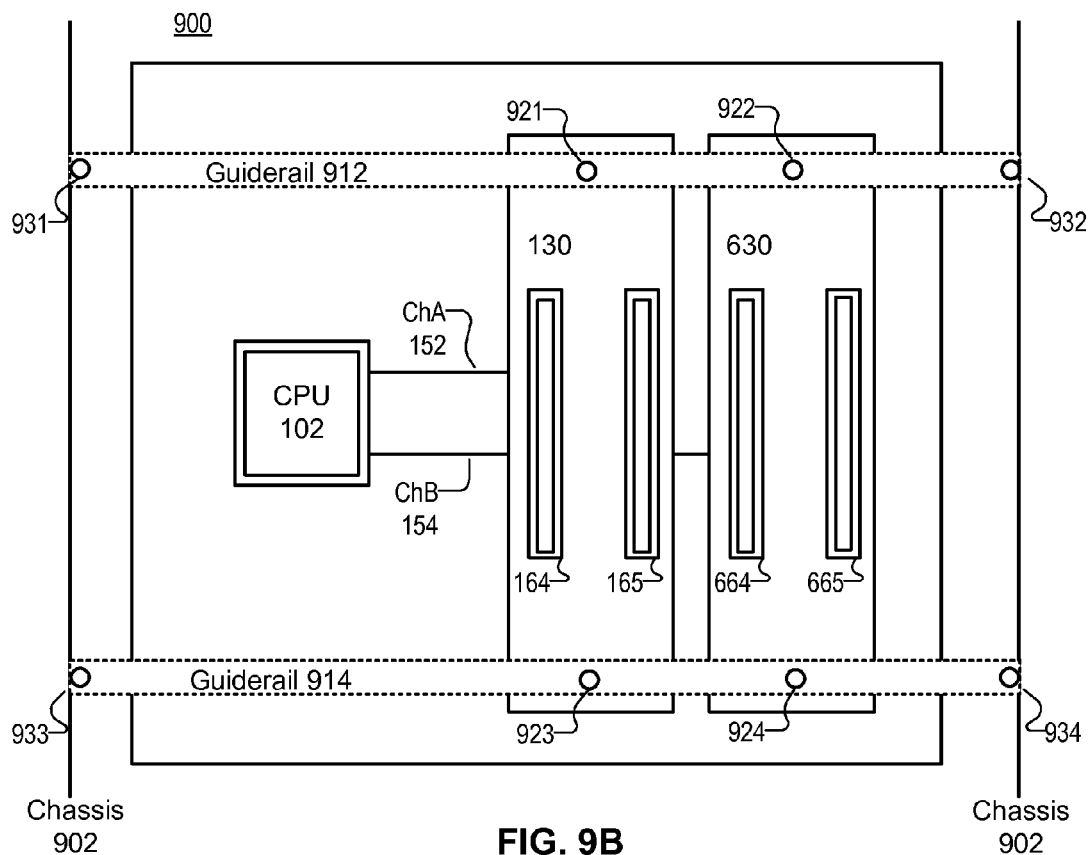
FIG. 9B is a top down view of the computing system, according to an embodiment of the present disclosure.

FIG. 9A is a side view of a computing system 900 inside a chassis 902 of a computing device, and FIG. 9B is a top down view of the computing system 900, according to an embodiment of the present disclosure. The computing system 900 is similar to the computing system 600 of FIG. 6A, but now includes a chassis 902 and two guiderails 912 and 914. Chassis 902 may be, for example, a server chassis made from metal that encloses the internal components of a server. Chassis 902 includes a bottom panel beneath the motherboard 110 and sides that surround the motherboard 110.

Guiderails 912 and 914 secure the mezzanine cards 130 and 630 to the chassis 902 so that the mezzanine cards 130 and 630 do not become detached. The guiderails 912 and 914 are made from a rigid and non-flexible material such as metal or plastic, and are shaped like a rectangular bar. Guiderails 912 and 914 extend from one side of chassis 902 to another side of the chassis 902. Guiderail 912 is detachably attached to the top of mezzanine boards 130 and 630 with fasteners 921 and 922. The ends of guiderail 912 are detachably attached to the chassis 902 with fasteners 931 and 932. Guiderail 914 is detachably attached to the mezzanine boards 130 and 630 with fasteners 923 and 924. The ends of guiderail 914 is detachably attached to the chassis 902 with fasteners 933 and 934. Examples of fasteners are screws or other mechanical fasteners capable of holding two structures together.

In one embodiment, the computing system 900 is assembled as follows. First, DIMMs 144 and 644 are inserted into DIMM connectors 162 and 662. Riser cards 120 and 620 are inserted into DIMM connectors 163 and 663. Next, mezzanine cards 130 and 630 are connected to riser cards 120 and 620 via riser card connectors 170 and 670. Guiderails 912 and 914 are then fastened to the chassis 902 and mezzanine cards 130 and 630.

Any of the features of the embodiments described herein may be combined with or added to the other embodiments. For example, the guiderails 912 and 914 can be added to any of the computing systems of the other figures. As another example, the riser cards 120 of FIG. 4A-4D may be mixed with the mezzanine cards of FIG. 5A-5D in various embodiments. In other embodiments there may be a greater number (e.g., 3 or 4) of data sub-channels 214 and 216 and a corresponding greater number (e.g. 3 or 4) of DIMM connectors on the mezzanine card 130.

In another embodiment mezzanine card 130 can be oriented vertically instead of horizontally. This configuration results in DIMMs 140 and 142 being oriented horizontally instead of vertically. In another embodiment the mezzanine card 130 may be not be used. Instead, the riser card 120 can be an extended riser card that is taller (e.g., 2×, 3× taller) than the riser card 120 shown in FIG. 1. The extended riser card includes two memory module connectors that support two horizontally oriented DIMMS. Other variations of these configurations may also be possible.

Upon reading this disclosure, those of skill in the art may appreciate still additional alternative designs for expanding memory capacity in a computing system. Thus, while particular embodiments and applications of the present disclosure have been illustrated and described, it is to be understood that the disclosure is not limited to the precise construction and components disclosed herein. Various modifications, changes and variations which may be apparent to those skilled in the art may be made in the arrangement, operation and details of the method and apparatus of the present disclosure herein without departing from the spirit and scope of the disclosure as defined in the appended claims.

What is claimed is:

1. A computing system comprising:
a memory controller;
a motherboard including a first memory module connector;
a first riser card inserted into the first memory module connector;
a first mezzanine card connected to the first riser card, the first mezzanine card including a first mezzanine memory module connector and a second mezzanine memory module connector;
a memory channel electrically connecting the memory controller to the first mezzanine memory module connector and the second mezzanine memory module connector via the motherboard, the first riser card and the first mezzanine card, the memory channel comprising:
a first data sub-channel for a first plurality of data bits, the first data sub-channel electrically connecting the memory controller to the first mezzanine memory module connector via the motherboard, the first riser card and the first mezzanine card, the first data sub-channel not electrically connected to the second mezzanine memory module connector;

a second data sub-channel for a second plurality of data bits, the second data sub-channel electrically connecting the memory controller to the second mezzanine memory module connector via the motherboard, the first riser card and the first mezzanine card, the second-data sub-channel not connected to the first mezzanine memory module connector; and a command and address (C/A) channel electrically connecting the memory controller to both the first mezzanine memory module connector and the second mezzanine memory module connector via the motherboard, the first riser card and the first mezzanine card; and a first memory module connected to the first mezzanine memory module connector and a second memory module connected to the second mezzanine memory module connector, the first memory module comprising:
a first plurality of pins and a second plurality of pins;
a first integrated circuit chip comprising a first dynamic data buffer, the first dynamic data buffer selectively routing data between the first plurality of pins and a selected one of the first memory die and the second memory die; and
a second integrated circuit chip comprising a second dynamic data buffer, the second dynamic data buffer selectively routing data between the second plurality of pins and a selected one of the third memory die and the fourth memory die.

2. The computing system of claim 1, further comprising:
a C/A buffer located on one of the first riser card or the first mezzanine card, the C/A buffer to buffer C/A signals between a first portion of the C/A channel and a second portion of the C/A channel.

3. The computing system of claim 1, further comprising:
a voltage regulator located on one of the first riser card or the first mezzanine card, the voltage regulator to convert a first supply voltage into a second supply voltage for at least one of the first memory module or the second memory module.

4. The computing system of claim 1, wherein the first riser card is substantially perpendicular to the motherboard and the first mezzanine card is substantially parallel to the motherboard.

5. The computing system of claim 1, wherein the first mezzanine card further comprises:
a riser card connector connected to the first riser card, wherein the riser card connector is located on a bottom side of the first mezzanine card, the first mezzanine memory module connector is located on a top side of the first mezzanine card, and the second mezzanine memory module connector is located on the top side of the first mezzanine card.

6. The computing system of claim 1, wherein the motherboard includes a second memory module connector, and further comprising:
a memory module connected to the second memory module connector, wherein the first mezzanine card is located over the memory module and the second memory module connector.

7. The computing system of claim 1, further comprising:
a chassis; and
a guide rail fastened to the first mezzanine card and also fastened to the chassis.

8. The computing system of claim 1, wherein the first integrated circuit chip is a 3D stacked memory package comprising the first dynamic data buffer, the first memory die and the second memory die.

9. The computing system of claim 1, the memory module further comprising a third plurality of pins and a fourth plurality of pins, and wherein:
the first dynamic data buffer selectively routes data between a selected one of the first plurality of pins corresponding to a first data nibble and the third plurality of pins corresponding to a third data nibble and a selected one of the first memory die and the second memory die; and
the second dynamic data buffer selectively routes data between a selected one of the second plurality of pins corresponding to a second data nibble and the fourth plurality of pins corresponding to a fourth data nibble and a selected one of the third memory die and the fourth memory die.

10. The computing system of claim 3, further comprising a cable having one end connected to the motherboard and another end connected to the one of the first riser card or the first mezzanine card, the cable providing the first supply voltage to the voltage regulator.

11. The computing system of claim 5, wherein the riser card connector is located directly below the second mezzanine memory module connector.

12. A computing system comprising:
a memory controller;
a motherboard including a first memory module connector and a second memory module connector;
a first riser card inserted into the first memory module connector;
a first mezzanine card connected to the first riser card, the first mezzanine card including a first mezzanine memory module connector for a first memory module and a second mezzanine memory module connector for a second memory module;
a memory channel electrically connecting the memory controller to the first mezzanine memory module connector and the second mezzanine memory module connector via the motherboard, the first riser card and the first mezzanine card;
a second riser card inserted into the second memory module connector;
a second mezzanine card connected to the second riser card, the second mezzanine card including a third mezzanine memory module connector for a third memory module and a fourth mezzanine memory module connector for a fourth memory module; and
another memory channel electrically connecting the memory controller to the third mezzanine memory module connector and the fourth mezzanine module connector via the motherboard, the second riser card and the second mezzanine card.

13. The computing system of claim 12, further comprising:
a voltage regulator board connected to both the first mezzanine card and the second mezzanine card, the voltage regulator board converting a first supply voltage into a second supply voltage for at least one of the first memory module, the second memory module, the third memory module, or the fourth memory module.

14. A computing system comprising:
a memory controller;
a motherboard including a first memory module connector and a second memory module connector;

a first riser card inserted into the first memory module connector;

a second riser card inserted into the second memory module connector;

a first mezzanine card connected to the first riser card and the second riser card, the first mezzanine card including:
  a first mezzanine memory module connector for a first memory module;
  a second mezzanine memory module connector for a second memory module;
  a third mezzanine memory module connector for a third memory module;
  a fourth mezzanine memory module connector for a fourth memory module; and
  a voltage regulator to convert a first supply voltage into a second supply voltage for at least one of the first memory module, the second memory module, the third memory module, or the fourth memory module;

a memory channel electrically connecting the memory controller to the first mezzanine memory module connector and the second mezzanine memory module connector via the motherboard, the first riser card and the first mezzanine card; and another memory channel electrically connecting the memory controller to the third mezzanine memory module connector and the fourth mezzanine module connector via the motherboard, the second riser card and the first mezzanine card.

15. A computing system comprising:

a mezzanine card for connection to a riser card, the mezzanine card comprising:
  a printed circuit board (PCB) having a first side and a second side opposite to the first side;
  a first memory module connector, the first memory module connector on the first side of the PCB;
  a second memory module connector, the first memory module connector on the first side of the PCB;
  a riser card connector for the riser card, the riser card connector on the second side of the PCB;
  a memory channel comprising:
    a first data sub-channel for a first plurality of memory bits, the first memory data channel electrically connecting, via the PCB, the riser card connector to the first memory module connector but not the second memory module connector;
    a second data sub-channel for a second plurality of memory bits, the second memory data channel electrically connecting, via the PCB, the riser card connector to the second memory module connector but not the first memory module connector; and
    a command and address (C/A) channel electrically connecting, via the PCB, the riser card connector to both the first memory module connector and the second memory module connector; and a first memory module connected to the first memory module connector and a second memory module connected to the second memory module connector, the first memory module comprising:
  a first plurality of pins and a second plurality of pins;
  a first integrated circuit chip comprising a first dynamic data buffer, the dynamic data buffer selectively routing data between the first plurality of pins and a selected one of the first memory die and the second memory die; and
  a second integrated circuit chip comprising a second dynamic data buffer, the dynamic data buffer selectively routing data between the second plurality of pins and a selected one of the third memory die and the fourth memory die.

16. The computing system of claim 15, the mezzanine card further comprising:
  a voltage regulator to convert a first supply voltage into a second supply voltage for at least one of the first memory module or the second memory module.

17. The computing system of claim 15, the mezzanine card further comprising:
  a cable connector for coupling to a cable, the cable connector to receive the first supply voltage via the cable.

* * * * *